(12) United States Patent
Hussaini et al.

(10) Patent No.: US 7,253,218 B2
(45) Date of Patent: Aug. 7, 2007

(54) SOUND DAMPING COMPOSITIONS AND METHODS FOR APPLYING AND BAKING SAME ONTO SUBSTRATES

(75) Inventors: Akbar Syed Hussaini, Rochester Hills, MI (US); Silveiro Rodrigues, Bloomfield Hills, MI (US); Michael Jess Antonie, Madison Heights, MI (US)

(73) Assignee: H.B. Fuller Company, St. Paul, MN (US)

( * ) Notice: Subject to any disclaimer, the term of this patent is extended or adjusted under 35 U.S.C. 154(b) by 66 days.

(21) Appl. No.: 10/790,410

(22) Filed: Mar. 1, 2004

(65) Prior Publication Data

US 2005/0189442 A1 Sep. 1, 2005

(51) Int. Cl.
C08K 7/16 (2006.01)
C08K 3/26 (2006.01)
C08K 3/34 (2006.01)
C08K 3/40 (2006.01)

(52) U.S. Cl. ............... 523/223; 524/425; 524/449; 524/494; 524/560; 181/296; 427/352; 427/372.2; 427/385.5

(58) Field of Classification Search ............ 523/223; 524/425, 449, 494, 560; 181/296; 427/352, 427/372.2, 385.5
See application file for complete search history.

(56) References Cited

U.S. PATENT DOCUMENTS

| | | |
|---|---|---|
| 3,864,181 A | 2/1975 | Wolinski et al. |
| 3,952,949 A | 4/1976 | Dupre |
| 4,350,782 A | 9/1982 | Küchler et al. |
| 4,456,507 A | 6/1984 | Kivel et al. |
| 4,587,278 A | 5/1986 | Dotzauer et al. |
| 4,747,541 A | 5/1988 | Morine et al. |
| 5,004,151 A | 4/1991 | Dupre |
| 5,292,066 A | 3/1994 | Torii et al. |
| 5,435,842 A | 7/1995 | Mukaida et al. |
| 5,520,961 A | 5/1996 | Lysell et al. |
| 5,536,315 A | 7/1996 | Guzowski et al. |
| 5,547,129 A | 8/1996 | Fortunato et al. |
| 5,563,188 A | 10/1996 | Ziems |
| 5,618,859 A | 4/1997 | Maeyama et al. |
| 5,635,562 A | 6/1997 | Malcolm |
| 5,670,202 A | 9/1997 | Guzowski et al. |
| 5,769,947 A | 6/1998 | Krappweis |
| 5,810,251 A | 9/1998 | McKinney |
| 5,823,389 A | 10/1998 | Guzowski |
| 5,823,427 A | 10/1998 | Dupre et al. |
| 5,840,797 A | 11/1998 | Singh |
| 5,887,800 A | 3/1999 | McClosky |
| 6,103,152 A | 8/2000 | Gehlsen et al. |
| 6,129,290 A | 10/2000 | Nikkanen |
| 6,130,284 A | 10/2000 | Singh |
| 6,325,302 B1 | 12/2001 | Guzowski et al. |
| 6,340,519 B1 | 1/2002 | Tanaka et al. |
| 6,364,218 B1 | 4/2002 | Tudor et al. |
| 6,368,438 B1 | 4/2002 | Chang et al. |
| 6,387,470 B1 | 5/2002 | Chang et al. |
| 6,436,255 B2 | 8/2002 | Yamamoto et al. |
| 6,455,605 B1 | 9/2002 | Giorgini et al. |
| 6,547,157 B2 | 4/2003 | Jervas |
| 6,612,509 B2 | 9/2003 | Holmstrom |
| 6,686,033 B1 | 2/2004 | Chacko |
| 6,691,932 B1 | 2/2004 | Schultz et al. |

(Continued)

FOREIGN PATENT DOCUMENTS

JP  4000036  1/1992

(Continued)

OTHER PUBLICATIONS

Hussaini, Akbar, Designing an Interior Applied Waterborne Coating for Use in Automotive Paint Shops to Replace Sound Deadening Pads, SAE Technical Paper Series, 2000-01-1391, SAE 2000 World Congress, Detroit, MI, Mar. 6-9, 2000, SAE International.

(Continued)

Primary Examiner—Kriellion Sanders
(74) Attorney, Agent, or Firm—Daniel F. Nesbitt; Hasse & Nesbitt LLC

(57) ABSTRACT

An applicator head for connection to a robotic device, and useful for applying a fluid material to a substrate. The applicator head comprises: (a) a body portion; (b) at least one material delivery system comprising an inlet, a fluid delivery cavity, and two or more passageways connecting the inlet to the fluid delivery cavity; and (c) a nozzle plate attached to the bottom surface of the body portion, and having a plurality of openings communicating with the fluid delivery cavity. In one embodiment, the applicator head comprises a nozzle inserted in each of the plurality of openings in the nozzle plate, with each nozzle adapted to apply a bead of a fluid material to a substrate, with the beads spaced less than about 2 mm apart. Also disclosed is a sound-damping composition comprising: (a) n-butyl acrylate-acrylonitrile-styrene copolymer; (b) at least about 0.5% by weight of a low-density glass bead filler; (c) at least one additional filler; and (d) at least one rheological modifier; and having a density of from about 1 to about 2 g/cc. Methods for applying the sound-damping composition by extruding it onto a substrate and baking it to exhaust water in a controlled manner, and methods for increasing the sound-damping efficacy of an aqueous polymeric composition, are also disclosed.

36 Claims, 5 Drawing Sheets

U.S. PATENT DOCUMENTS

| | | |
|---|---|---|
| 6,695,923 B1 | 2/2004 | Schultz et al. |
| 6,705,537 B2 | 3/2004 | Schultz et al. |
| 6,872,761 B2 * | 3/2005 | LeStarge .................... 523/218 |
| 2002/0014201 A1 | 2/2002 | Holstrom |
| 2003/0131791 A1 | 7/2003 | Schultz et al. |
| 2004/0147942 A1 | 7/2004 | Chang et al. |

FOREIGN PATENT DOCUMENTS

| | | |
|---|---|---|
| JP | 4198272 | 7/1992 |
| JP | 07166093 | 6/1995 |
| JP | 10266388 | 10/1998 |
| JP | 11334653 | 12/1999 |

OTHER PUBLICATIONS

Formulation of EF3000 sound-damping composition sold by EFTEC North America since May, 2001.

Test result of EF-3000, Dec. 22, 2000, Nihon Tokushu Toryo Co., Ltd.

Preliminary Data Sheet on EFTEC Low Frequency Interior Sound Deadeners, including EF3000, given to Toyota Motors for commercial purposes on Dec. 18, 2000.

Product Comparison Sheet on EFTEC Low Frequency Interior Sound Deadeners, including EF3000, given to Ford Motor Co. for commercial purposes on Aug. 2, 2000.

* cited by examiner

SOUND DAMPING COMPOSITIONS AND METHODS FOR APPLYING AND BAKING SAME ONTO SUBSTRATES

FIELD OF THE INVENTION

The invention relates to an applicator head for connection to a robotic device. The applicator head is useful for applying a fluid material, such as a bakeable, waterborne, liquid-applied sound-damping composition, to a substrate. The invention also relates to such a sound-damping composition, a method for applying it to a substrate, and a method for increasing sound-damping efficacy.

BACKGROUND OF THE INVENTION

In order to decrease the noise associated with vibration in various industrial machines, vehicles, and appliances, manually applied die-cut mastic or asphaltic sound deadening pads have been employed. The construction of new die-cut pads, which correspond to various part layouts, can be expensive due to the complexity of the parts. Also, the installation and replacement of these deadening pads can be labor intensive since the pads are manually applied.

To decrease vibration noise, vibration damping coatings, including low-frequency, vibration-damping coatings that are epoxy or PVC based, have been employed. However, these coatings often are expensive because of high material costs. Furthermore, such coatings have low sound-damping characteristics and do not fully exceed the benefits of die-cut sound pads for the temperature range between −20° C. and 60° C. The use of these coatings has also raised environmental concerns. Unused or scrap materials from an epoxy-based, liquid-applied sound-damping treatment are considered hazardous waste that requires special disposal methods. Use of a PVC-based coating introduces vinyl chloride into the environment.

Aqueous vibration-damping coatings have also been used to decrease vibration noise. However, the vibration-damping characteristics of known bakeable or air-dried waterborne coatings are adequate only in a narrow temperature range. Such aqueous vibration-damping coatings have been applied by robotic controlled applicator guns, examples of which include airless spray, air-assisted spray, swirl, flow-bar and slit nozzle type applicators. However, such devices cannot apply high surface weight, waterborne compositions in a manner that provides controlled drying. Moreover, when such devices are used to apply a bakeable, waterborne, liquid-applied sound-damping composition to the surface of an object, the sound transmission loss and damping properties of the composition are often compromised.

SUMMARY OF THE INVENTION

In one aspect, the invention provides an applicator head for connection to a robotic device, the applicator head being useful for applying a fluid material, such as a bakeable, waterborne, liquid-applied sound-damping composition, to a substrate, for example, the surface of an object. The applicator head comprises a body portion having a top surface, a bottom surface, and first and second ends. The applicator head further comprises at least one material delivery system defined by the body portion. The material delivery system comprises an inlet, a fluid delivery cavity in the bottom surface of said body portion, and two or more passageways connecting said inlet to said fluid delivery cavity. A nozzle plate is attached to the bottom surface of the body portion. The nozzle plate is provided with a plurality of openings communicating with said fluid delivery cavity.

In one embodiment, a nozzle is inserted in each of the openings in the nozzle plate that communicate with the fluid delivery cavity. The nozzle plate is typically removably attached to the bottom surface of the body portion so that it can be removed and replaced with another nozzle plate having the same or a different plurality of openings. In another embodiment, each of the nozzles is adapted to be easily removed and replaced with a different nozzle. Each nozzle is capable of applying a bead of the fluid material to the substrate, such as the surface of object. The beads are typically spaced less than about 2 mm apart. In another embodiment, the nozzles apply beads that have a width of from about 1 to about 12 mm and a thickness of from about 1 to about 5 mm.

In another aspect, the invention provides a sound-damping composition comprising:
 (a) n-butyl acrylate-acrylonitrile-styrene copolymer in an effective amount for sound-damping response;
 (b) at least about 0.5% by weight of a low-density glass bead filler;
 (c) at least one additional filler; and
 (d) at least one rheological modifier in an effective amount for controlling the sag and slide resistance of the composition;

wherein the sound-damping composition has a density of from about 1 to about 2 g/cc.

The invention also relates to a composition that has increased sound-damping efficacy after being baked for at least 10 minutes at a temperature of at least about 107° C. versus a pre-baked composition, said composition comprising a polymeric system, at least one low-density glass bead filler, at least one additional filler, and at least one rheological modifier, and wherein said composition has a density of from about 1 to about 2 g/cc.

In another aspect, the invention provides a method of applying the sound-damping composition to a substrate by extruding the composition onto the substrate; and baking it to exhaust water content in a controlled manner.

The invention also provides a method for increasing the sound-damping efficacy of an aqueous polymeric composition comprising the steps of:
 (a) extruding the composition onto a substrate; and
 (b) baking the extruded composition for at least about 10 minutes at a temperature of at least about 107° C.;

wherein the sound-damping efficacy of the composition after baking is greater than before baking.

The invention also relates to a method of applying an aqueous polymeric material intended to be dried by an oven, said method comprising extruding the aqueous polymeric material onto a substrate in beads having a width of from about 1 mm to about 12 mm and a thickness of from about 1 mm to about 5 mm, with a spacing of less than about 2 mm between the beads.

DETAILED DESCRIPTION OF THE INVENTION

Figure 1:
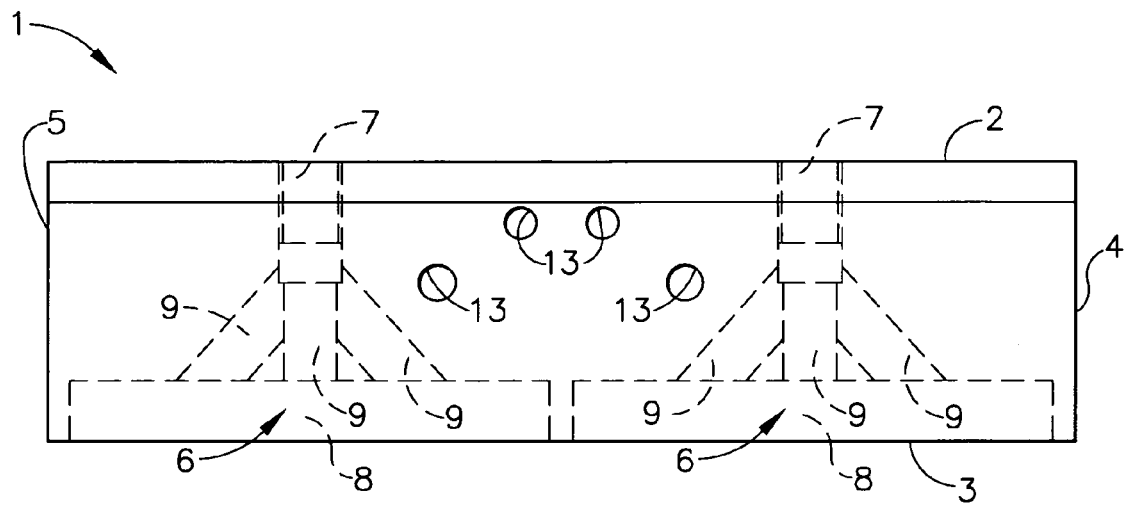
FIG. 1 is a front side view of one embodiment of a body portion of applicator head of the invention.
Figure 2:
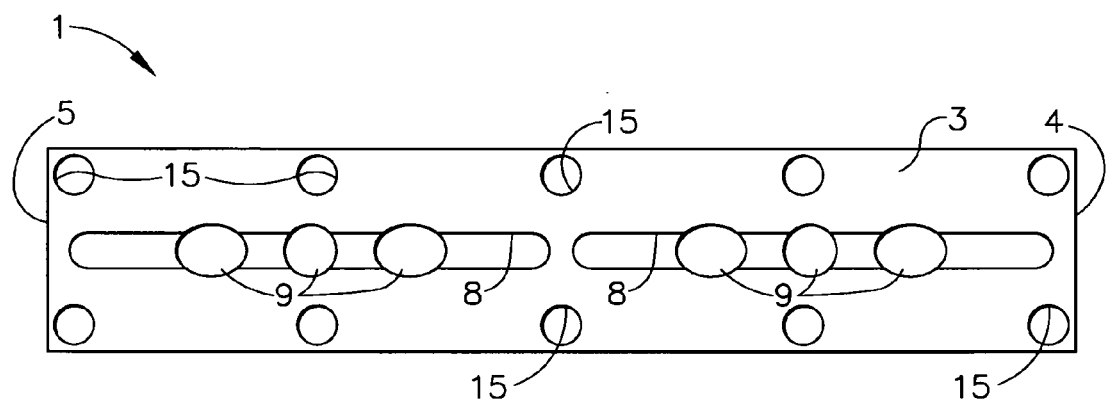
FIG. 2 is a bottom view of the body portion of FIG. 1.
Figure 3:
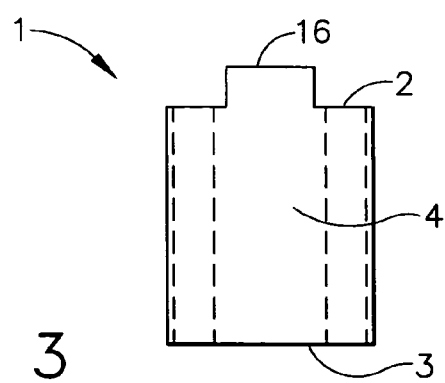
FIG. 3 is an end side view of the body portion of FIGS. 1 and 2.

The applicator head of the invention typically is carried on a robotic device with a delivery system for providing a fluid material, such as a bakeable, waterborne, liquid-applied sound-damping composition, that is applied to a substrate. With reference to FIGS. 1 to 3, one embodiment of an applicator head of the invention comprises a body portion generally indicated at 1. The body portion has a top surface 2, a bottom surface 3, a first end 4, and a second end 5. At least one material delivery system, generally indicated at 6, is defined by the body portion 1. The material delivery system 6 comprises an inlet 7, a fluid delivery cavity 8 in the bottom surface 3 of said body portion 1, and two or more passageways, such as the three passageways 9 shown in FIG. 1, connecting inlet 7 to fluid delivery cavity 8. By providing two or more passageways from the inlet 7 to the fluid delivery cavity 8, the delivery of the fluid material to the fluid delivery cavity 8 is more uniform along its length.

In the embodiment shown in FIGS. 1 to 3, the body portion 1 has a generally rectangular cross section and is provided with two material delivery systems 6 side by side. By providing two or more material delivery systems 6, greater coverage area on the substrate can be achieved as well as increased versatility since the flow of material to one or more of the material delivery systems can be shut off when a smaller coverage area is desired. The inlets 7 in this embodiment are typically ¼ inch (about 0.64 cm) in diameter employing standard NPT pipe threads to facilitate connection of conduits from the fluid material delivery system (not shown) on the robotic device.

In FIGS. 1 and 2, the body portion 1 is about 6.25 inches (about 15.88 cm) long by 1.250 inches (about 3.18 cm) wide and 1.750 inches (about 4.45 cm) high. Each fluid delivery cavity 8 is about 2.938 inches (about 7.46 cm) long, 0.250 inches (about 0.64 cm) wide, and 0.375 inches (about 0.95 cm) deep. The passageways 9 are about 5/16 inches (about 0.79 cm) in diameter. In the embodiment shown, there are three passageways 9 from the inlet 7 to fluid delivery cavity 8. One of the passageways is aligned with inlet 7. The other two passageways are angled from inlet 7 at, in this case, about 50°. Other shapes and sizes of the material delivery system, inlet, cavity and passageways from the inlet to the fluid delivery cavity, and the number of these components and their location, are possible, and the invention is not restricted to the applicator head illustrated.

A plurality of holes 13 are provided for connection of the applicator head body portion to the robotic device. These holes may be located at various points to match the attachment requirements of the robotic device. A plurality of holes 15 are also provided in the bottom surface 3 of the body portion for attachment of a nozzle plate (as described below).

As illustrated in FIG. 3, the top surface 2 of body portion 1 has a centrally-disposed longitudinal step portion 16. In the embodiment shown, step portion 16 is about 0.500 inches (about 1.27 cm) wide and 0.250 inches (about 0.64 cm) high. The inlets 7 for the fluid delivery systems 6 are centered on the step portion 16. The inlets 7 can be provided in other locations depending on the design of the material delivery system on the robotic device.

Figure 4:
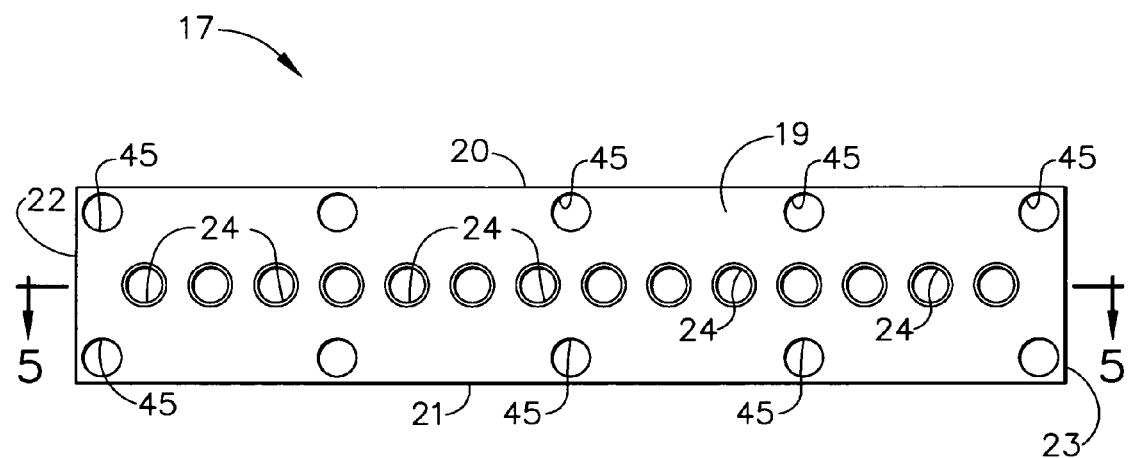
FIG. 4 is a bottom plan view of one embodiment of a nozzle plate for attachment to the bottom surface of the body portion of the applicator head of FIG. 1.
Figure 5:
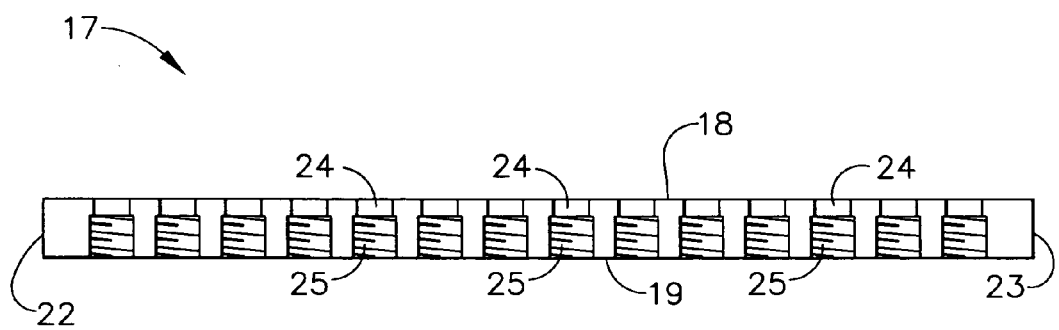
FIG. 5 is a sectional view of the nozzle plate of FIG. 4 taken along line 5-5.
Figure 9:
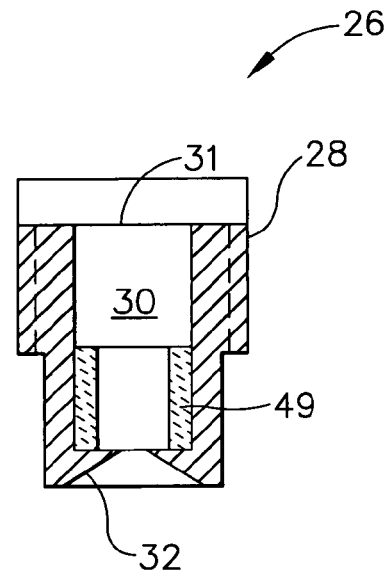
FIG. 9 is a sectional view of the nozzle of FIG. 8 taken along line 9-9.
Figure 10:
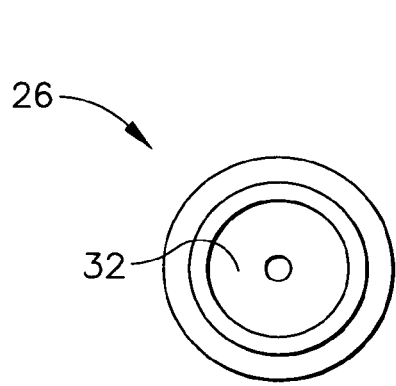
FIG. 10 is a bottom plan view of the nozzle of FIG. 8.
Figure 11:
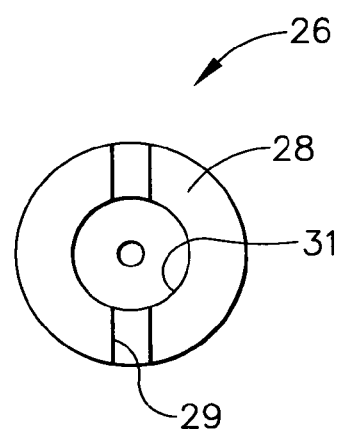
FIG. 11 is a top plan view of the nozzle of FIG. 8.

FIGS. 4 and 5 show one embodiment of a nozzle plate, generally indicated at 17, adapted for attachment to the bottom surface 3 of the body portion 1 of the applicator head. The nozzle plate 17 has a top surface 18, bottom surface 19, front side 20 and back side 21, and opposite ends 22, 23. The nozzle plate 17 illustrated in FIGS. 4 and 5 is sized and shaped to match the bottom surface 3 of body portion 1. The nozzle plate 17 is provided with a plurality of openings 24 extending from its bottom surface 19 to top surface 18 that communicate with the fluid delivery cavity 8. Each of the openings 24 is adapted to retain a nozzle 26, such as shown in FIGS. 8 to 11. In the embodiment shown, the top section 25 of each opening 24 is provided with a female thread to match with a male thread 27 on the top section 28 of each nozzle 26. Slot 29 permits each nozzle 26 to be screwed into each opening 24 using a screw driver. By using a threaded connection, nozzles of a different design can be attached to the nozzle plate 17 depending on the nature of the application. A longitudinal passageway, such as passageway 30 shown in FIG. 9, through each nozzle 26 permits the fluid material from fluid cavities 8 to be extruded through the nozzle 26 onto the substrate. A carbide nozzle insert, such as insert 49 shown in FIG. 9, is provided in the inlet 31 of nozzle 26 to minimize wear of the nozzle. In one embodiment, the carbide insert has a length of about 0.13 inches (about 0.33 cm) and a diameter of about 0.142 inches (about 0.36 cm), and is press fitted against the outlet 32 of nozzle 26. The outlet 32 of nozzle 26 is typically beveled, such as shown in FIG. 9.

Figure 6:
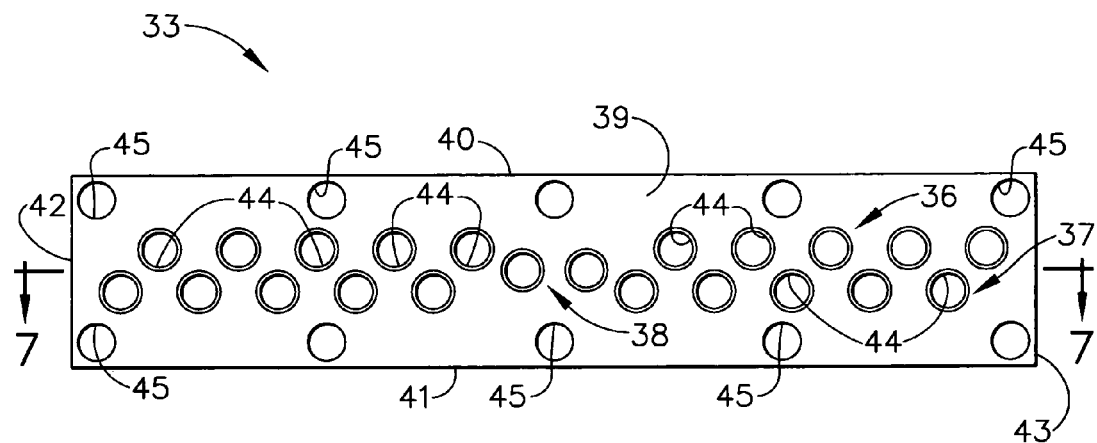
FIG. 6 is a bottom plan view of a second embodiment of a nozzle plate for attachment to the bottom surface of the body portion of the applicator head of FIG. 1.
Figure 7:
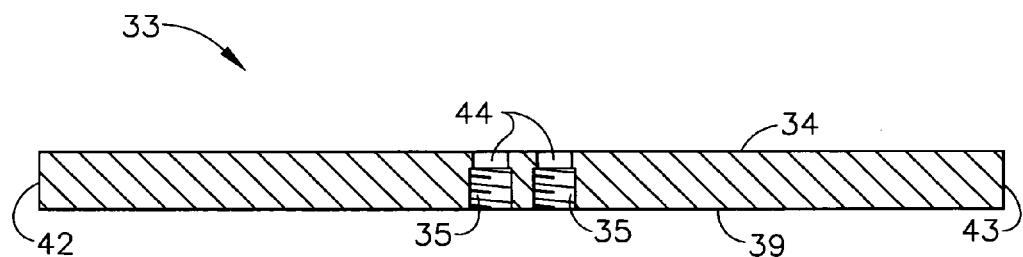
FIG. 7 is a sectional view of the nozzle plate of FIG. 6 taken along line 7-7.
Figure 8:
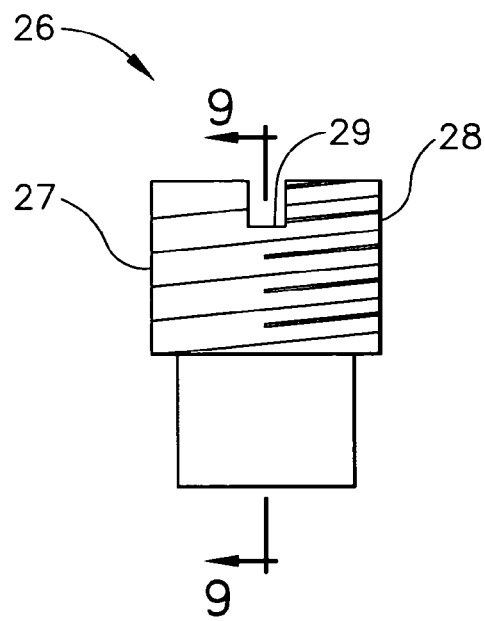
FIG. 8 is a plan view of one embodiment of a nozzle for inserting in an opening in the nozzle plate of FIG. 4 or 6.

FIGS. 6 and 7 show a second embodiment of a nozzle plate, generally indicated at 33, adapted for attachment to the bottom surface 3 of the body portion 1 of the applicator head. The nozzle plate 33 has a top surface 34, bottom surface 39, front side 40 and back side 41, and opposite ends 42, 43. The nozzle plate 33 illustrated in FIGS. 6 and 7 is sized and shaped to match the bottom surface 3 of body portion 1. The nozzle plate 33 is provided with a plurality of openings 44 from its bottom surface 39 to top surface 34 that communicate with the fluid delivery cavity 8. Each of the openings 44 is adapted to retain a nozzle 26, such as shown in FIGS. 8 to 11. In the embodiment shown, the top section 35 of each opening 44 is provided with a female thread to match with a male thread 27 on the top section 28 of each nozzle 26.

As noted above, the invention allows one to extrude the fluid material onto a substrate in a manner to provide a controlled rate of drying at high surface weights of the material. The arrangement of the openings 24 in the nozzle plate 17, and of the openings 44 in nozzle plate 33, is configured to provide the desired disposition and/or rate of drying. FIGS. 4 and 5 show one configuration, and FIGS. 6 and 7 show another configuration, for the openings in the nozzle plate. Other configurations are possible depending on the application.

In FIGS. 4 and 5, the plurality of openings 24 in the nozzle plate 17 are arranged in a straight line. In the embodiment shown, there are fourteen openings 24 provided in the nozzle plate 17, seven of the openings communicating with the fluid delivery cavity 8 in each of two material delivery systems 6. In the embodiment illustrated, the openings 24 are arranged at 0.406 inches (about 1.03 cm) center to center, and have a diameter of 0.250 inches (about 0.64 cm) at the bottom surface 19 of nozzle plate 17. Each nozzle 26 has a 0.247 inches (about 0.63 cm) diameter outlet 32 beveled as shown in FIG. 9.

In FIGS. 6 and 7, the plurality of openings 44 in the nozzle plate 33 are arranged in a plurality of rows so that the openings 44 in a row are off-set from the openings in adjacent rows. In the embodiment shown, there are twenty-two openings 44 in three rows, eleven of the openings communicating with the fluid delivery cavity 8 in each of two material delivery systems 6. In the embodiment illustrated, the openings 44 in the two outside rows 36 and 37 are arranged at 0.500 inches (about 1.27 cm) center to center, and have a diameter of 0.250 inches (about 0.64 cm) at the bottom surface 39 of nozzle plate 33. The middle row 38 has only two openings 44 arranged at 0.406 inches (about 1.03 cm) center to center, one of which communicates with the fluid delivery cavity 8 in one of the two material delivery systems 6. The outside rows 36, 37 are arranged with the centers of each row being 0.250 inches (about 0.64 cm) apart. The center line of the two openings in the middle row 38 are 0.125 inches (about 0.32 cm) from the center line of each of the two outside rows.

Both of the nozzle plates 17 and 33 are provided with a plurality of holes 45 that align with the plurality of holes 15 in the bottom surface 3 of body portion 1 to permit the nozzle plates 17, 33 to be attached to the body portion by screws, bolts or other suitable fasteners. By use of screws or bolts to attach and interchange different nozzle plates to the body portion, the applicator head of the invention has improved versatility.

Figure 12:
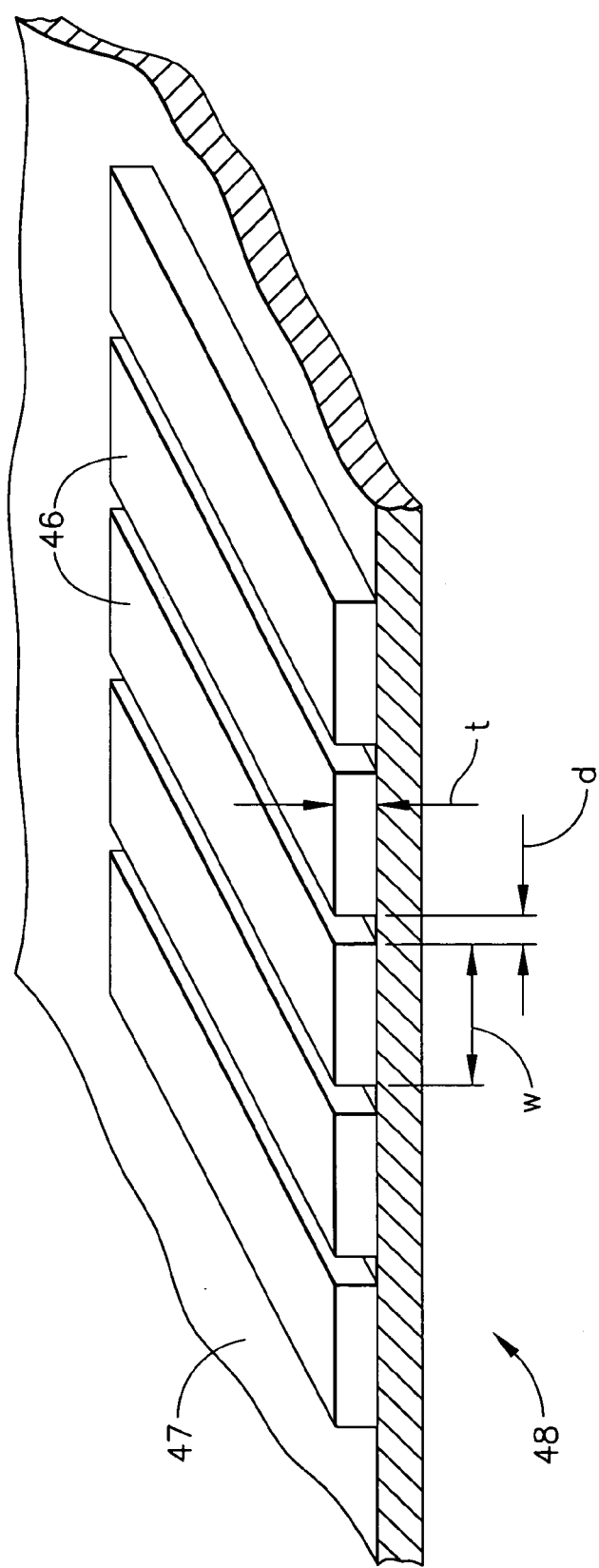
FIG. 12 is a schematic drawing of part of a bead pattern of a waterborne, sound-damping composition applied by an applicator head of the invention.

With reference to FIG. 12, the applicator head of the invention applies beads 46 of fluid material through nozzles 26 to the surface 47 of the substrate 48. In order to apply the material and provide a controlled rate of drying at high surface weights of the material, the nozzles 26 typically apply beads that are spaced apart at a distance d not exceeding about 2 mm. With this configuration, the applied material, for example a waterborne sound-damping composition, has a large exposed surface area and substantially uniform drying is achieved without compromising the sound-damping properties of the material. The nozzles 26 typically apply beads that have a width w of from about 1 to about 12 mm, more typically from about 2 to about 10 mm (e.g., from about 5 to about 8 mm). The beads generally have a thickness t of from about 1 to about 5 mm, typically from about 2 to about 3 mm. The ratio of the width to the thickness of the bead is usually at least about 1.5:1 and typically from about 2:1 to about 5:1. FIG. 12 illustrates schematically a series of beads applied to a substrate. The total number of beads applied at a time will be determined by the application and may be influenced by factors such as dispense pressure, cycle time, speed and/or stand-off distance. The number and arrangement of the openings can vary provided the beads are spaced less than 2 mm apart to obtain controlled drying rates without compromising sound transmission loss and damping properties of the composition.

The applicator head of the invention is particularly useful for applying to a substrate a sound-damping composition comprising:
(a) n-butyl acrylate-acrylonitrile-styrene copolymer in an effective amount for sound-damping response;
(b) at least about 0.5% by weight of a low-density glass bead filler;
(c) at least one additional filler; and
(d) at least one rheological modifier in an effective amount for controlling the sag and slide resistance of the composition;

wherein the sound damping composition has a density of from about 1 to about 2 g/cc.

The composition typically comprises from about 13% to about 25%, by weight, n-butyl acrylate-acrylonitrile-styrene copolymer. Examples of suitable copolymers include the Acronal S504 and Acronal A378 binders from BASF. Variations may be employed to shift peak damping response temperature above or below about 25° C., as required.

In one embodiment, the sound-damping composition further comprises at least one glycidyl methacrylate functional multipolymer acrylic material having a glass transition temperature of from about 0° to about 60° C. A suitable material is the GMA material available from H.B. Fuller Company.

The composition further comprises from about 30% to about 75%, typically from about 40% to about 65%, by weight, of filler selected from the group consisting of dolomitic limestone, limestone, calcium carbonate, plastic microspheres, and mica, and mixtures thereof. Of these, the limestone and mica fillers are especially useful. A suitable limestone filler is the GPR 200 material available from Global Stone Penrock. A suitable mica filler is available from Oglebay Norton Special Minerals as dry ground mica 4 K filler. Plastic microspheres useful herein are typically included at a level of from about 0.02% to about 0.4%, more typically from about 0.1% to about 0.3%, by weight. Useful materials include Expancel DU092-120 from Akzo Nobel, and E130-095D plastic microspheres from Sovereign Packaging Group.

The composition also typically comprises less than about 5%, by weight, rheological modifiers for sag/slide resistance. Suitable rheological modifiers include the Attagel® 30 material from Engelhard, the Acrysol® RM-8W associative thickener from Rohm and Haas, and the Acusol™ 820 non-associative thickener from Rohm and Haas.

The compositions of the invention also comprise less than about 10%, by weight, of other additives, such as additives for shelf stability, solvents, dispersants, surfactants, antibacterial agents, pigments, dyes, defoamer, and the like.

The sound-damping compositions further comprises from about 18% to about 30%, typically from about 22% to about 28%, by weight of water when applied to the substrate, and prior to baking. After baking the compositions typically comprise less than about 2%, more typically less than about 1%, by weight of water.

The composition can be prepared by mixing the liquid ingredients in a vessel, adding the powder ingredients and mixing until a homogeneous paste is obtained, and then adding rheological modifiers and water to obtain the desired viscosity and density. The compositions usually have an initial viscosity of from about 40,000 to about 100,000 centipoise, typically from about 50,000 to about 80,000 centipoise, when measured using a Brookfield viscometer at 20 rpm and spindle number 7.

The composition of the invention has a density of from about 1 to about 2 g/cc, typically from about 1.1 to about 1.6 g/cc (e.g., from about 1.2 to about 1.4 g/cc), which provides the desired sound-damping and rheological properties at high surface thickness (up to about 5 mm).

The composition of this invention can be applied with an applicator of the type described above, which forms several cumulative parallel bead formations applied with a gap of less than about 2.0 mm between the beads. The total number of beads (coverage area) will be determined by the application. This may involve other factors such as dispense pressure, cycle time, speed and/or stand-off distance.

For uniform flux through to the surface, the bead dimensions of the composition are typically maintained at a width of from about 1 mm to about 12 mm (e.g., from about 2 to about 10 mm, but more typically from about 5 to about 8 mm), and a thickness of from about 1 mm to about 5 mm (e.g., from about 2 to about 3 mm). After application on the substrate, the composition is typically baked for at least about 10 minutes, more typically from about 15 to about 30 minutes, at a temperature of at least about 107° C., typically between about 124° C. and about 191° C., to exhaust water content in a controlled manner.

The damping response at high and low frequencies (e.g., 0-16,000 Hz) of compositions of the invention is typically better than that of sound pads and other coatings at temperatures between −20° C. and 60° C. using the SAEJ1637 Oberst Bar method at 2.44 kg/m².

EXAMPLES

Compositions A, B, and C of the invention comprise the following raw materials at the indicated levels. The compositions are obtained by first adding the liquid materials to a vessel, and mixing at room temperature. The powder filler materials are then added and mixed at room temperature until a smooth homogeneous paste is obtained. The rheological additives and water are then added with mixing to adjust the viscosity to about 60,000 centipoise and the density to about 1.3 g/cc.

| | Weight % | | |
|---|---|---|---|
| Raw Material | A | B | C |
| Water | 3.05 | 3.05 | 3.05 |
| Propylene glycol | 4.00 | 4.00 | 4.00 |
| Dispersant | 0.90 | 0.90 | 0.90 |
| Nonionic surfactant (30% sol. in water) | 0.90 | 0.90 | 0.90 |
| Attagel ® 30 rheology modifier | 2.50 | 2.50 | 2.50 |
| Acronal S504 binder (55% sol. in water) | 40.00 | 35.00 | 35.00 |
| Acronal A 378 binder (55% sol. in water) | 0.00 | 5.00 | 0.00 |
| GMA (55% sol. in water) | 0.00 | 0.00 | 5.00 |
| Biocide | 0.02 | 0.02 | 0.02 |
| Pigment | 0.20 | 0.20 | 0.20 |
| GPR 200 limestone filler | 31.83 | 31.83 | 31.83 |
| Water | 0.24 | 0.24 | 0.24 |
| Acrysol ® RM-8W rheology thickener | 0.08 | 0.08 | 0.08 |
| Dry ground mica 4K filler | 12.31 | 12.31 | 12.31 |
| Expancel DU 092-120 plastic microspheres | 0.02 | 0.02 | 0.02 |
| E130-095D plastic microspheres | 0.25 | 0.25 | 0.25 |
| Scotclite Bubbles VS 5500 (Glass bead filler - 3M Company) | 2.50 | 2.50 | 2.50 |
| Sodium hydroxide | 0.05 | 0.05 | 0.05 |
| Acusol ™ 820 rheology thickener | 0.80 | 0.80 | 0.80 |
| Defoamer | 0.35 | 0.35 | 0.35 |
| TOTAL | 100.00 | 100.00 | 100.00 |

The above compositions are lightweight, acrylic-based waterborne compositions that exhibit one or more of the following benefits: improved elasticity, improved vibration-damping capabilities over a wider temperature range, and improved low-frequency vibration damping at between 0-1000 Hz. Moreover, the compositions can be adhered to a variety of substrates, such as electrocoat, engineered plastics, and stainless steel.

With the use of an automated application system, such as the applicator head of the invention connected to a robotic device, the above low-density, waterborne compositions provide a sound-damping alternative to the labor-intensive application of sound pads. Another advantage of the invention is the elimination of a source of dirt in the paint shop, thereby providing better painting results and fewer repairs. The compositions of the invention typically provide higher damping performance in comparison to asphaltic pads, PVC, epoxy coatings, rubber-based coatings, and bitumen coatings. Assembly plants and manufacturers of components are also able to optimize damping performance of cars and trucks with a robotic bulk system that can localize and maximize coverage of the sound-damping composition. By using a bulk composition, part complexity, floor space, inventory costs and packaging waste can also be reduced. In addition to cost advantages and superior acoustic properties, the invention can also provide environmental benefits since manufacturers are able to implement a process consistent with the "Green Car" concept with 0% VOC, 0% PVC, and 0% HAP (Hazardous Air Pollutants).

Although various embodiments of the invention have been described herein in detail, it will be appreciated by those skilled in the art that variations may be made thereto without departing from the spirit of the invention or the scope of the appended claims.

What is claimed is:

1. A bakeable sound-damping composition comprising:
    (a) n-butyl acrylate-acrylonitrile-styrene copolymer in an effective amount for sound-damping response;
    (b) at least about 0.5% by weight of a low-density glass bead filler;
    (c) at least one additional filler; and
    (d) at least one rheological modifier in an effective amount for controlling the sag and slide resistance of the composition;
wherein said bakeable sound-damping composition has a density of from about 1 to about 2 g/cc.

2. The bakeable sound-damping composition according to claim 1 further comprising at least one glycidyl methacrylate functional multipolymer acrylic material having a glass transition temperature of from about 0° C. to about 60° C.

3. The bakeable sound-damping composition according to claim 1 wherein the composition has a density of from about 1.1 to about 1.6 g/cc.

4. The bakeable sound-damping composition according to claim 3 wherein the composition has a density of from about 1.2 to about 1.4 g/cc.

5. The bakeable sound-damping composition according to claim 1 wherein the additional filler is selected from the group consisting of dolomitic limestone, limestone, calcium carbonate, plastic microspheres, and mica, and mixtures thereof.

6. The bakeable sound-damping composition according to claim 5 comprising from about 30% to about 75% by weight of the additional filler.

7. The bakeable sound-damping composition according to claim 6 comprising from about 1% to 5% by weight of the glass bead filler.

8. The bakeable sound-damping composition according to claim 1 comprising, by weight: (a) from about 13% to about 25% n-butyl acrylate-acrylonitrile-styrene copolymer; (b)

from about 1% to about 5% of a low-density glass bead filler; (c) from about 40% to about 65% of additional filler selected from the group consisting of dolomitic limestone, limestone, calcium carbonate, plastic microspheres, and mica, and mixtures thereof; (d) less than about 5% of rheological modifiers; (e) less than about 10% of other additives; and (f) water.

9. A method for applying a sound-damping composition to a substrate, comprising the steps of:
(1) providing a bakeable sound-damping composition comprising:
 (a) n-butyl acrylate-acrylonitrile-styrene copolymer in an effective amount for sound-damping response;
 (b) at least about 0.5% by weight of a low-density glass bead filler;
 (c) at least one additional filler;
 (d) at least one rheological modifier in an effective amount for controlling the sag and slide resistance of the composition; and
 (e) water;
wherein said bakeable sound-damping composition has a density of from about 1 to about 2 g/cc;
(2) extruding the bakeable composition onto a substrate as parallel bead formations; and
(3) baking the extruded composition to exhaust water content in a controlled manner.

10. A method according to claim 9 wherein the extruded composition is baked at a temperature of at least about 107° C.

11. The method according to claim 9 wherein the bakeable composition is extruded in bead formations having a width of from about 1 mm to about 12 mm.

12. The method according to claim 9 wherein the bakeable composition is extruded in bead formations having a thickness of from about 1 mm to about 5 mm.

13. The method according to claim 9 wherein the bakeable composition is extruded in bead formations spaced less than about 2 mm apart.

14. The method according to claim 9 wherein the bakeable composition is extruded in bead formations having a width of from about 1 mm to about 12 mm and a thickness of from about 1 mm to about 5 mm, with a spacing of less than about 2 mm between the bead formations.

15. The method according to claim 14 wherein the bakeable composition is extruded in bead formations having a width of from about 5 to about 8 mm and a thickness of from about 2 to about 3 mm.

16. A method according to claim 9 wherein the bakeable composition is baked for from about 15 to about 30 minutes at a temperature between about 124° C. and about 191° C.

17. A method according to claim 14 wherein the bakeable composition is baked from about 15 to about 30 minutes at a temperature between about 124° C. and 191° C.

18. A method of increasing the sound-damping efficacy of an aqueous polymeric composition comprising the steps of:
(a) extruding the aqueous polymer composition onto a substrate in parallel bead formations having a width of from about 1 mm to about 12 mm and a thickness of from about 1 mm to about 5 mm, with a spacing of less than about 2 mm between the bead formations; and
(b) baking the extruded composition for at least about 10 minutes at a temperature of at least about 107° C.;
wherein the sound-damping efficacy of the composition after baking is greater than before baking.

19. A method according to claim 18 wherein the aqueous polymeric composition has a density of from about 1 to about 2 g/cc.

20. A method of applying an aqueous polymeric material intended to be dried by an oven, said method comprising extruding the aqueous polymeric material onto a substrate in parallel bead formations having a width of from about 1 mm to about 12 mm and a thickness of from about 1 mm to about 5 mm, with a spacing of less than about 2 mm between the bead formations.

21. The method according to claim 20 wherein the material is applied to effectuate sound-damping and the substrate is an automobile component.

22. The method according to claim 20 wherein the material is applied to effectuate sound-damping and the substrate is a cell phone component.

23. The method according to claim 20 wherein the material is applied to effectuate sound-damping in a sink.

24. The method according to claim 20 wherein the material is applied to effectuate sound-damping and the substrate is an appliance selected from the group consisting of dishwashers, dryers, washing machines, blenders, food processors, mixers, fans, air conditioners, snowmobiles, lawnmowers, and convection ovens.

25. The method according to claim 20 wherein the material is applied to effectuate sound-damping and has a density of from about 1 to about 2 g/cc.

26. The method according to claim 25 wherein the material is a sound-damping composition comprising an n-butyl acrylate-acrylonitrile-styrene copolymer in an effective amount for sound-damping response; at least one low-density glass bead filler; at least one additional filler; and at least one rheological modifier in an effective amount for controlling the sag and slide resistance of the material.

27. The method according to claim 20 further comprising the step of baking the extruded material for at least about 10 minutes at a temperature of at least about 107° C.

28. The method according to claim 27 wherein the material is a sound-damping composition comprising an n-butyl acrylate-acrylonitrile-styrene copolymer in an effective amount for sound-damping response; at least one low-density glass bead filler; at least one additional filler; and at least one rheological modifier in an effective amount for controlling the sag and slide resistance of the material.

29. The method according to claim 28 wherein the sound-damping composition has a density of from about 1 to about 2 g/cc.

30. A bakeable sound-damping composition comprising:
(a) a polymeric composition comprising n-butyl acrylate-acrylonitrile-styrene copolymer in an effective amount for sound-damping response;
(b) at least about 0.5% by weight of a low-density glass bead filler having an isostatic crush strength of at least 5500 psi;
(c) at least one additional filler; and
(d) at least one rheological modifier in an effective amount for controlling the sag and slide resistance of the composition;
wherein said bakeable sound-damping composition has a density of from about 1 to about 2 g/cc.

31. The bakeable sound-damping composition according to claim 30, comprising about 1% to 5% by weight of the low-density glass bead filler.

32. The bakeable sound-damping composition according to claim 30, further comprising from about 0.02% to about 0.4% by weight of expandable plastic micro spheres.

33. The bakeable sound-damping composition according to claim 30 wherein the composition has a density of from about 1.1 to about 1.6 g/cc.

34. The bakeable sound-damping composition according to claim 33 wherein the composition has a density of from about 1.2 to about 1.4 g/cc.

35. The bakeable sound-damping composition according to claim 30 wherein the additional filler is selected from the group consisting of dolomitic limestone, limestone, calcium carbonate, plastic microspheres, and mica, and mixtures thereof.

36. The bakeable sound-damping composition according to claim 35 comprising from about 30% to about 75% by weight of the additional filler.

* * * * *